United States Patent Office 3,019,911
Patented Feb. 6, 1962

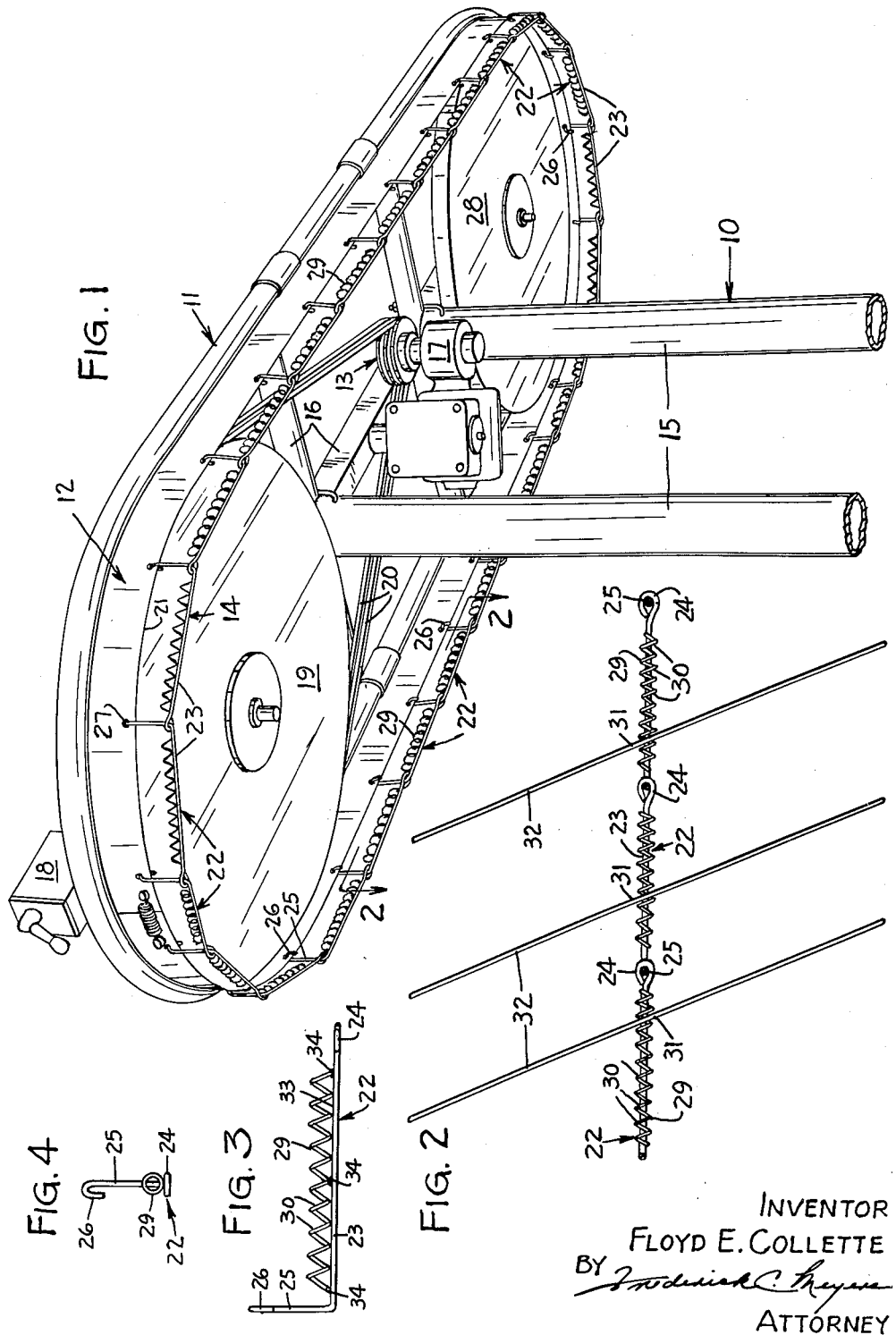
Feb. 6, 1962   F. E. COLLETTE   3,019,911
SUSPENSION DEVICE FOR TRAVELING BELT CONVEYOR
Filed April 7, 1958
INVENTOR
FLOYD E. COLLETTE
BY
ATTORNEY

3,019,911
SUSPENSION DEVICE FOR TRAVELING BELT CONVEYOR
Floyd E. Collette, 713 4th St., Farmington, Minn.
Filed Apr. 7, 1958, Ser. No. 726,839
5 Claims. (Cl. 211—122)

This invention relates to endless conveyors, and more particularly to a suspension device utilized therewith.

A flat and flexible belt traveling in a generally horizontal pathway and utilized for carrying articles suspended therefrom constitutes a simple and inexpensive conveyor. Applicant discloses such a conveyor in his co-pending applications, Serial No. 431,112, filed May 20, 1954, now Patent No. 2,880,878, and entitled "Traveling Rack," and Serial No. 726,838, filed of even date herewith, now Patent No. 2,980,258. In certain applications of flexible belt conveyors, as, for example, those utilized for conveying clothes in drycleaning establishments and the like, it becomes desirable to provide means for suspending the articles of clothing at any position along the device and not merely at selected spaced intervals. Where the articles are merely suspended at intervals along the conveyor, there is no problem encountered at bends in the traveling belt since the spacing between points of suspension can be large compared with the area utilized for holding the article and the belt will not be restricted in its flexibility. On the other hand, if a continuous rigid suspension means be secured to a conveyor belt, then the flexibility of the belt will be lost and the apparatus cannot be used in an endless manner requiring return bends. If the suspension means itself is flexible, then it may sag or yield under the load of articles suspended therefrom and place unnecessary strains on the belt and associated parts.

It is within the contemplation of the present invention and an important object thereof to overcome the above mentioned difficulties and to provide a flexible belt suspension system which will be strong and efficient, yet which will easily conform to flexing of the belt in its curving travel.

Another object of the invention is to provide a horizontal support bar which is adapted to be secured in depending relation from the lower edge of a flexible belt so as to maintain the center of gravity of articles suspended therefrom substantially in the plane of the belt.

A further object is to provide a suspension linkage of the class described which is made up of units, a portion of each being flexibly suspended from a flexible belt edge and another portion being pivotally interlocked with the suspended portion of the neighboring unit.

A still further object is to provide suspension means for a conveyor utilizing an endless belt traveling in a horizontal pathway which will be continuous for the length of the belt and will have means furnishing a multiplicity of positions from which to suspend hangers or the like in space-saving angulation.

These and other objects and advantages of my invention will more fully appear from the following description, made in connection with the accompanying drawings, wherein like reference characters refer to the same parts throughout the several views and in which:

FIGURE 1 is a perspective view from beneath of the traveling belt conveyor with the suspension devices therefrom;

FIGURE 2 is an enlarged horizontal section of the suspension linkage taken on the line 2—2 of FIGURE 1 and looking in the direction of the arrows;

FIGURE 3 is a still further enlarged side elevation of a suspension link unit; and FIGURE 4 is an end view of the unit taken from the right in FIGURE 3.

With continued reference to the drawing, my conveyor apparatus is shown in FIG. 1 and comprises generally a supporting structure 10, an endless track 11, a flexible traveling belt 12 and a drive mechanism 13 for the belt conveyor. The suspension system which comprises the invention set forth herein is shown generally at 14.

The supporting structure 10 may comprise a plurality of standards 15 to which are secured bracing members 16 in rigid manner as illustrated. At the outer ends of the braces 16 is secured the endless track 11 with roller means (not shown) for retaining the belt conveyor 12 in vertically edgewise position while traveling in a horizontal plane. The drive mechanism 13 comprises a motor 17 actuated by manual control 18 through electrical connections (not shown), the motor driving a wheel 19 through belts 20 and thereby causing the belt conveyor 12 to travel in endless manner with respect to its track 11.

The belt conveyor 12 is flat and flexible and terminates in a lower edge margin 21 which is free of the wheel 19 and other parts of the conveyor apparatus. The suspension system 14 comprises individual suspension units 22 which are secured to the lower belt margin 21. The suspension devices each have a horizontal rod 23, as shown particularly in FIGURE 3, and are of a convenient length forming a relatively small cord with respect to the rate of curvature of wheel 19 about which the belt 12 is trained. The rod 23 has a pivot opening or eye 24 formed at one end and is provided with an upwardly bent portion 25 at the other end, as shown in FIGS. 2, 3 and 4. The upwardly bent portion 25 terminates in a fastener such as hook 26 which is, in turn, adapted to be freely suspended from the lower belt margin 21, as by simply retaining hook 26 in opening 27 formed therethrough. Opening 27 is of slightly larger diameter than that of the hook 26 so as to permit free suspension and a small amount of movement without causing corresponding flexing of the belt 12.

When assembled, the suspension units may be arranged in continuous fashion for the length of belt 12 with the eye 24 surrounding the upstanding portion 25 of the neighboring unit 22 and thereby providing a pivot point immediately beneath the hook fastener 26. The rod 23 will then lie substantially in a horizontal plane spaced below the lower edge margin 21 of belt 12 and be rigid for its length but providing flexibility in the system. As the belt 12 curves around the drive wheel 19, the linkage of individual suspension units 22 will bend therewith but will not interfere with the smooth flexing of belt 12 because each unit is secured virtually at a point rather than for a lengthwise distance of the belt. The pivot opening or eye 24 surrounds the bent portion 25 and can turn thereon sufficiently to permit each of the units 22 to move with the belt 12 and to conform to the curvature thereof in its travel around drive wheel 19 and idler wheel 28. The suspension units 22 are substantially directly beneath the edge margin 21 of flexible belt 12 at all times and, hence, the downward pull of articles suspended therefrom will be directly in the plane of the belt 12 and will not cause any lateral strains to be applied thereto.

In order to provide separate positions for suspending clothes and the like along the length of the individual rods 23, I utilize a coil spring element 29 having open convolutions 30 for receiving hooks 31 of hanger elements 32, as shown in FIGS. 2 and 3. The coil spring 29 is secured to the upper edge 33 of rod 23 as by tack welds 34. The curvature of the coil element 29 at the individual convolutions 30 is such as to naturally dispose the wire hangers 32 in angulated position, as shown in FIG. 2. The angulation of the hangers and clothes suspended therefrom shortens the required space across the device and, hence, renders the conveyor capable of operating with a given capacity in a smaller amount of space.

It may thus be seen that I have devised a suspension system which will be firm and rigid and capable of supporting a multiplicity of articles therefrom and from the lower edge of a flexible belt without placing undue strains on the belt and permitting free curved travel thereof when employed as an endless belt conveyor.

It will, of course, be understood that various changes may be made in the form, details, arrangements and proportions of the parts without departing from the scope of my invention as set forth in the appended claims.

What I claim is:

1. In an endless belt conveyor of the type adapted to travel edgewise in a horizontal plane, a suspension device therefor comprising, a flexible traveling belt having a free lower edge, an elongated horizontal rod having an eye formed at one end thereof and an upturned portion terminating in a fastener at the other end, said fastener being freely suspended from the lower edge of the belt and the eye portion being adapted to pivotally surround the upturned portion of another elongated horizontal rod also freely suspended from the lower edge of said belt at a position in spaced horizontal relation therefrom.

2. In an endless belt conveyor of the type adapted to travel edgewise in a horizontal plane, a suspension device therefor comprising, a flexible traveling belt having a free lower edge margin, an elongated horizontal rod having a pivot opening vertically disposed therethrough at one end and having at the other end an upwardly bent portion disposed substantially at right angles thereto and terminating at its upper end in a hook, said hook being freely suspended from the lower edge margin of said belt and the pivot opening being adapted to receive the upwardly bent portion of a neighboring suspension device freely suspended in the same manner with respect to said belt.

3. A suspension device adapted to support a plurality of clothes hangers and the like thereon which comprises, a flexible traveling belt disposed vertically edgewise for endless horizontal travel, an elongated rod suspended at each end in spaced relation below the lower margin of said belt, and a coiled wire element secured along the upper side of said rod, the individual convolutions thereof furnishing retainers for the hooks of clothes hangers and maintaining clothes and hangers in space-saving angulation with respect to the direction of travel of the belt.

4. A suspension device adapted to support a plurality of articles such as clothes hangers with clothes thereon which comprises, a flexible traveling belt disposed vertically edgewise for an endless horizontal travel, an elongated horizontal rod having an eye at one end and an upturned portion terminating in a hook at the other end, said hook being adapted to be freely suspended from the lower edge margin of the belt conveyor and the eye portion being adapted to pivotally surround the upturned portion of an adjacent device, and a coiled wire element secured along the upper side of said rod between said eye and upturned portion, the individual convolutions of said element furnishing retainers for the hooks of clothes hangers and maintaining the hangers together with clothes thereon in space-saving angulation with respect to the direction of travel of the belt.

5. A suspension device adapted to support a plurality of clothes hangers and the like thereon which comprises, a flexible traveling belt disposed vertically edgewise for endless horizontal travel, said belt being provided at spaced intervals along its lower margin with openings, a plurality of elongated horizontal rods each having a pivot opening vertically disposed therethrough at one end and having at the other end an upwardly bent portion passing through the pivot opening of an adjacent rod, said upwardly bent portion terminating at its upper end in a hook, said hook being secured in an opening and freely suspending each horizontal rod beneath the lower edge of said flexible traveling belt whereby said elongated horizontal rods may be employed for suspending articles such as hangers with clothes thereon and pivotally conforming to the pathway of said flexible traveling belt in its endless horizontal travel with said hangers and clothes suspended therefrom.

References Cited in the file of this patent

UNITED STATES PATENTS

| | | |
|---|---|---|
| 409,839 | Hennig | Aug. 27, 1889 |
| 928,980 | Kaufman et al. | July 27, 1909 |
| 2,573,275 | Richey | Oct. 30, 1951 |
| 2,899,072 | Weiss | Aug. 11, 1959 |